(12) United States Patent
Yang

(10) Patent No.: US 12,492,324 B2
(45) Date of Patent: Dec. 9, 2025

(54) BUTENE-CONTAINING POLYMER LAYERS FOR ROOFING

(71) Applicant: BMIC LLC, Dallas, TX (US)

(72) Inventor: Li-Ying Yang, Whippany, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/088,445

(22) Filed: Mar. 24, 2025

(65) Prior Publication Data

US 2025/0297138 A1  Sep. 25, 2025

Related U.S. Application Data

(60) Provisional application No. 63/569,308, filed on Mar. 25, 2024.

(51) Int. Cl.
| | | |
|---|---|---|
| *B32B 21/00* | (2006.01) | |
| *B32B 21/02* | (2006.01) | |
| *B32B 21/08* | (2006.01) | |
| *B32B 27/18* | (2006.01) | |
| *B32B 27/32* | (2006.01) | |
| *B32B 37/12* | (2006.01) | |
| *B32B 37/26* | (2006.01) | |
| *C09J 5/00* | (2006.01) | |
| *C09J 7/24* | (2018.01) | |

(Continued)

(52) U.S. Cl.
CPC ............ *C09J 7/241* (2018.01); *B32B 21/02* (2013.01); *B32B 21/08* (2013.01); *B32B 27/18* (2013.01); *B32B 27/32* (2013.01); *B32B 37/12* (2013.01); *B32B 37/26* (2013.01); *C09J 5/00* (2013.01); *E04D 5/06* (2013.01); *E04D 5/148* (2013.01); *B32B 2037/268* (2013.01); *B32B 2255/10* (2013.01); *B32B 2255/26* (2013.01); *B32B 2270/00* (2013.01); *B32B 2307/54* (2013.01); *B32B 2307/748* (2013.01); *B32B 2323/00* (2013.01); *B32B 2419/06* (2013.01); *C09J 2203/346* (2020.08); *C09J 2301/414* (2020.08)

(58) Field of Classification Search
CPC ......... B32B 21/08; B32B 27/18; B32B 27/32; B32B 37/12; B32B 37/26; B32B 2037/268; B32B 2255/10; B32B 2255/26; B32B 2270/00; B32B 2307/54; B32B 2307/748; B32B 2323/00; B32B 2419/06; C09J 5/00; C09J 2203/346; C09J 2301/414; E04D 5/06; E04D 5/148
See application file for complete search history.

(56) References Cited

U.S. PATENT DOCUMENTS

| | | | |
|---|---|---|---|
| 4,141,187 A | * | 2/1979 | Graves ................ E04D 7/00 52/309.3 |
| 7,799,406 B2 | | 9/2010 | Yang et al. |

(Continued)

*Primary Examiner* — Chi Q Nguyen
(74) *Attorney, Agent, or Firm* — GREENBERG TRAURIG, LLP

(57) ABSTRACT

Butene-containing polymer layers for roofing applications are provided. A roofing material comprises a first layer and an adhesive layer. The first layer comprises a thermoplastic polymer. The first layer comprises 0.01% to 35% by weight of a butene-containing polymer based on a total weight of the first layer. When the roofing material is installed on a roofing substrate, the adhesive layer is located between the first layer and the roofing substrate. Related materials, related systems, and related methods, among other things, are also provided.

20 Claims, 3 Drawing Sheets

(51) Int. Cl.
    *E04D 5/06*    (2006.01)
    *E04D 5/14*    (2006.01)

(56) References Cited

U.S. PATENT DOCUMENTS

| | | | |
|---|---|---|---|
| 7,927,695 B2 | 4/2011 | Raulie | |
| 8,313,599 B2* | 11/2012 | Hashimura | B29D 30/0681 |
| | | | 156/417 |
| 8,635,827 B2 | 1/2014 | Merryman et al. | |
| 9,446,568 B2* | 9/2016 | Larson | E04D 5/10 |
| 2003/0198813 A1 | 10/2003 | Howell | |
| 2006/0179749 A1* | 8/2006 | Brandt | B32B 27/40 |
| | | | 52/309.7 |
| 2007/0277450 A1* | 12/2007 | Raulie | B32B 25/00 |
| | | | 52/90.1 |
| 2008/0029210 A1* | 2/2008 | Swei | E04D 5/10 |
| | | | 428/521 |
| 2008/0227914 A1 | 9/2008 | Peng | |
| 2010/0279049 A1* | 11/2010 | Hubbard | C09J 125/08 |
| | | | 428/40.1 |
| 2014/0261965 A1* | 9/2014 | Tang | B32B 37/12 |
| | | | 525/105 |
| 2015/0267410 A1* | 9/2015 | Hubbard | E04D 13/16 |
| | | | 52/746.11 |
| 2021/0095474 A1* | 4/2021 | Yang | B32B 15/043 |
| 2022/0112721 A1* | 4/2022 | Tang | B32B 7/12 |
| 2022/0314585 A1 | 10/2022 | Pedrazzoli et al. | |
| 2023/0220244 A1* | 7/2023 | Lem | B32B 15/20 |
| | | | 428/98 |
| 2023/0304291 A1* | 9/2023 | Tang | B32B 11/046 |

* cited by examiner

BUTENE-CONTAINING POLYMER LAYERS FOR ROOFING

CROSS-REFERENCE TO RELATED APPLICATIONS

This application claims priority to and benefit of U.S. Provisional Patent Application No. 63/569,308, filed Mar. 25, 2024 and entitled "BUTENE-CONTAINING POLYMER LAYERS FOR ROOFING APPLICATIONS," the entirety of which is herein incorporated by reference.

FIELD

This disclosure generally relates to butene-containing polymer layers for roofing applications, and related materials, related systems, and related methods.

BACKGROUND

A roofing membrane can provide a barrier to elements of an environment. Some roofing membranes, for example, provide a moisture barrier. Some roofing membranes can extend a lifetime of an underlying roofing structure.

SUMMARY

Some embodiments relate to a roofing system. In some embodiments, the roofing system comprises a roofing substrate. In some embodiments, the roofing system comprises a roofing membrane. In some embodiments, the roofing membrane is located on the roofing substrate. In some embodiments, the roofing membrane comprises a first layer. In some embodiments, the first layer comprises a thermoplastic polymer. In some embodiments, the first layer comprises 0.01% to 35% by weight of a copolymer based on a total weight of the first layer. In some embodiments, the copolymer comprises a butene copolymer. In some embodiments, the roofing membrane comprises an adhesive layer. In some embodiments, the adhesive layer is located between the first layer and the roofing substrate.

In some embodiments, the roofing substrate comprises at least one of a roof deck, an oriented strand board, or any combination thereof.

In some embodiments, the thermoplastic polymer comprises at least one of a polypropylene, a polyethylene, or any copolymer thereof.

In some embodiments, the butene copolymer comprises at least one of ethylene, propylene, or any combination thereof.

In some embodiments, the butene copolymer comprises at least one of 1-butene, 2-butene, isobutene, or any combination thereof.

In some embodiments, the butene copolymer comprises at least one of a copolymer of a butene and an ethylene, a copolymer of a butene and a propylene, or any combination thereof.

In some embodiments, the first layer comprises 51% to 99% by weight of the thermoplastic polymer based on a total weight of the thermoplastic polymer and the copolymer. In some embodiments, the first layer comprises 1% to 49% by weight of the copolymer based on the total weight of the thermoplastic polymer and the copolymer.

In some embodiments, the first layer comprises 50% to 90% by weight of the thermoplastic polymer based on the total weight of the first layer. In some embodiments, the first layer comprises 1% to 10% by weight of a filler based on the total weight of the first layer.

Some embodiments relate to a roofing membrane. In some embodiments, the roofing membrane comprises a first layer. In some embodiments, the first layer comprises a thermoplastic polymer. In some embodiments, the first layer comprises 0.01% to 35% by weight of a copolymer based on a total weight of the first layer. In some embodiments, the copolymer comprises a butene copolymer. In some embodiments, the roofing membrane comprises an adhesive layer. In some embodiments, when the roofing membrane is installed, the adhesive layer is located between the first layer and a roofing substrate.

In some embodiments, the thermoplastic polymer comprises at least one of a polypropylene, a polyethylene, or any copolymer thereof.

In some embodiments, the butene copolymer comprises at least one of ethylene, propylene, or any combination thereof.

In some embodiments, the butene copolymer comprises at least one of 1-butene, 2-butene, isobutene, or any combination thereof.

In some embodiments, the butene copolymer comprises at least one of a copolymer of a butene and an ethylene, a copolymer of a butene and a propylene, or any combination thereof.

In some embodiments, the first layer comprises 51% to 99% by weight of the thermoplastic polymer based on a total weight of the thermoplastic polymer and the copolymer. In some embodiments, the first layer comprises 1% to 49% by weight of the copolymer based on the total weight of the thermoplastic polymer and the copolymer.

In some embodiments, the first layer comprises 50% to 90% by weight of the thermoplastic polymer based on the total weight of the first layer. In some embodiments, the first layer comprises 1% to 10% by weight of a filler based on the total weight of the first layer.

Some embodiments relate to a method of installation. In some embodiments, the method of installation comprises obtaining a roofing membrane. In some embodiments, the roofing membrane comprises a first layer. In some embodiments, the first layer comprises a thermoplastic polymer. In some embodiments, the first layer comprises 0.01% to 35% by weight of a copolymer based on a total weight of the first layer. In some embodiments, the copolymer comprises a butene copolymer. In some embodiments, the roofing membrane comprises an adhesive layer. In some embodiments, the roofing membrane comprises a release liner. In some embodiments, the adhesive layer is located between the first layer and the release liner. In some embodiments, the method of installation comprises removing the release liner from the roofing membrane, so as to expose the adhesive layer. In some embodiments, the method of installation comprises applying the adhesive layer to a roofing substrate, so as to adhere the roofing membrane to the roofing substrate.

In some embodiments, the thermoplastic polymer comprises at least one of a polypropylene, a polyethylene, or any copolymer thereof.

In some embodiments, the butene copolymer comprises at least one of ethylene, propylene, or any combination thereof.

In some embodiments, the butene copolymer comprises at least one of 1-butene, 2-butene, isobutene, or any combination thereof.

In some embodiments, the butene copolymer comprises at least one of a copolymer of a butene and an ethylene, a copolymer of a butene and a propylene, or any combination thereof.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
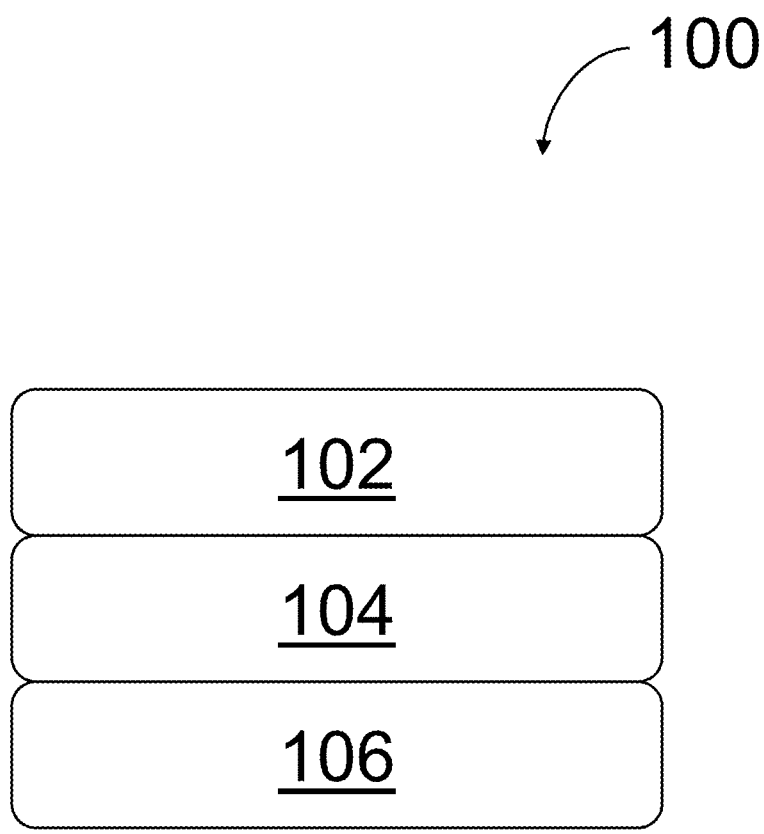
FIG. 1 is a schematic diagram of a cross-section of a roofing material, according to some embodiments.

Butene-containing polymer layers for roofing applications are provided. In some embodiments, a roofing material comprises a first layer located on an adhesive layer. In some embodiments, when a butene-containing polymer is present in the first layer with a thermoplastic polymer, and when the adhesive layer of the roofing material is adhered to a roofing substrate, the roofing material exhibits improved adhesion (e.g., peel strength), relative to a control roofing material that does not comprise a butene-containing polymer. In some embodiments, the improvement in adhesion to the roofing substrates corresponds to an improvement in wind uplift resistance. In some embodiments, the improvement in adhesion to the roofing substrates is observed, while also maintaining and/or improving the stretchability and/or flexibility of the roofing material. Related roofing materials, related systems, and related methods are also provided herein, among other things.

Some embodiments relate to a roofing material. As used herein, the term "roofing material" refers to at least one of a roofing membrane, a roofing shingle, a roofing substrate, a roofing accessory, or any combination thereof.

In some embodiments, the roofing material is a roofing membrane. In some embodiments, the roofing membrane is a single layer membrane. In some embodiments, the roofing membrane is a multi-layer membrane. In some embodiments, the roofing membrane is a liquid applied membrane. In some embodiments, the roofing membrane is an extruded roofing membrane. In some embodiments, the roofing membrane is a laminated roofing membrane. In some embodiments, the roofing membrane is a molded roofing membrane. In some embodiments, the roofing membrane is a reinforced roofing membrane. In some embodiments, the roofing membrane is an unreinforced roofing membrane. In some embodiments, the roofing membrane is a coated membrane. In some embodiments, the roofing membrane is a foam roofing membrane. In some embodiments, the roofing membrane is a closed-cell foam roofing membrane. In some embodiments, the roofing membrane is provided in the form of a roll of a roofing membrane. In some embodiments, the roofing membrane is provided in the form of a stack of roofing membranes.

In some embodiments, the roofing material comprises at least one layer. In some embodiments, the at least one layer is a coating. In some embodiments, the at least one layer is a sheet. In some embodiments, the at least one layer is a film. In some embodiments, the at least one layer comprises one (1) to ten (10) layers. For example, in some the at least one layer comprises at least one of a first layer, a second layer, a third layer, a fourth layer, a fifth layer, a sixth layer, a seventh layer, an eighth layer, a ninth layer, a tenth layer, or any combination thereof. In some embodiments, at least two layers are the same. In some embodiments, at least two layers are different. In some embodiments, at least one intervening layer is located between at least two layers. In some embodiments, at least two layers directly contact each other.

In some embodiments, the roofing material comprises a first layer.

In some embodiments, the first layer comprises a thermoplastic polymer.

In some embodiments, the first layer comprises 50% to 98% by weight of the thermoplastic polymer based on a total weight of the first layer. In some embodiments, the first layer comprises 50% to 95% by weight of the thermoplastic polymer based on the total weight of the first layer. In some embodiments, the first layer comprises 50% to 90% by weight of the thermoplastic polymer based on the total weight of the first layer. In some embodiments, the first layer comprises 50% to 85% by weight of the thermoplastic polymer based on the total weight of the first layer. In some embodiments, the first layer comprises 50% to 80% by weight of the thermoplastic polymer based on the total weight of the first layer. In some embodiments, the first layer comprises 50% to 75% by weight of the thermoplastic polymer based on the total weight of the first layer. In some embodiments, the first layer comprises 50% to 70% by weight of the thermoplastic polymer based on the total weight of the first layer. In some embodiments, the first layer comprises 50% to 65% by weight of the thermoplastic polymer based on the total weight of the first layer. In some embodiments, the first layer comprises 50% to 60% by weight of the thermoplastic polymer based on the total weight of the first layer. In some embodiments, the first layer comprises 50% to 55% by weight of the thermoplastic polymer based on the total weight of the first layer.

In some embodiments, the first layer comprises 55% to 98% by weight of the thermoplastic polymer based on the total weight of the first layer. In some embodiments, the first layer comprises 60% to 98% by weight of the thermoplastic polymer based on the total weight of the first layer. In some embodiments, the first layer comprises 65% to 98% by weight of the thermoplastic polymer based on the total weight of the first layer. In some embodiments, the first layer comprises 70% to 98% by weight of the thermoplastic polymer based on the total weight of the first layer. In some embodiments, the first layer comprises 75% to 98% by weight of the thermoplastic polymer based on the total weight of the first layer. In some embodiments, the first layer comprises 80% to 98% by weight of the thermoplastic polymer based on the total weight of the first layer. In some embodiments, the first layer comprises 85% to 98% by weight of the thermoplastic polymer based on the total weight of the first layer. In some embodiments, the first layer comprises 90% to 98% by weight of the thermoplastic polymer based on the total weight of the first layer. In some embodiments, the first layer comprises 95% to 98% by weight of the thermoplastic polymer based on the total weight of the first layer. In some embodiments, the first layer comprises 55% to 80% by weight of the thermoplastic polymer based on the total weight of the first layer. In some embodiments, the first layer comprises 60% to 80% by weight of the thermoplastic polymer based on the total weight of the first layer. In some embodiments, the first layer comprises 65% to 80% by weight of the thermoplastic polymer based on the total weight of the first layer. In some embodiments, the first layer comprises 70% to 80% by weight of the thermoplastic polymer based on the total weight of the first layer. In some embodiments, the first layer comprises 75% to 80% by weight of the thermoplastic polymer based on the total weight of the first layer.

In some embodiments, the thermoplastic polymer comprises a polyolefin. In some embodiments, the thermoplastic polymer comprises a thermoplastic polyolefin (TPO). In some embodiments, the thermoplastic polyolefin comprises at least one of polyethylene, polypropylene, any copolymer thereof, any homopolymer thereof, any polymer blend thereof, or any combination thereof. In some embodiments, the thermoplastic polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), polypropylenes (e.g., isotactic polypropylene (IPP) and/or atactic polypropylene (APP/IPP)), amorphous polyalpha olefins (APAO), amorphous polyolefins (APO), or any combination thereof. In some embodiments, the thermoplastic polymer does not comprise polyurethane.

Such thermoplastic polymers can include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvaloy®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

As used herein, a reference to a "[monomer]" refers to a substance used to form a polymer (e.g., an unreacted chemical compound in a form prior to polymerization), or to unit of a polymer (e.g., a monomer unit, that is, after the monomer has been polymerized and/or incorporated into the polymer). For example, in some embodiments, when referring to "ethylene" and/or "propylene" in the context of "a copolymer of an ethylene and a propylene," the "ethylene" refers to a unit, of the polymer, derived from ethylene (e.g., an ethylene derived unit, or an ethylene monomer unit), and/or the "propylene" refers to another unit, of the polymer, derived from propylene (e.g., a propylene derived unit, or a propylene monomer unit). Other examples of "[monomer]" used herein include, for example and without limitation, at least one of butene, 1-butene, 2-butene, isobutene, pentene, hexene, octene, decene, dodecene, tetradecene, hexadecene, octadecene, eicosene, docosene, tetracosene, hexacosene, octacosene, triacontene, or any combination thereof. In some embodiments, the second monomer unit comprises at least one of ethylene, propylene, 1-pentene, 1-hexene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, any isomer thereof, or any combination thereof.

In some embodiments, the thermoplastic polymer comprises at least one of a thermoplastic polyolefin, a thermoplastic elastomer, or any combination thereof. In some embodiments, the thermoplastic polymer comprises at least one of a polypropylene, a polyethylene, an ethylene copolymer, a propylene copolymer, or any combination thereof. In some embodiments, the thermoplastic polymer comprises a thermoplastic copolymer. For example, in some embodiments, the thermoplastic copolymer comprises propylene and ethylene. In some embodiments, the thermoplastic copolymer comprises a propylene and an ethylene. In some embodiments, the thermoplastic copolymer comprises an ethylene copolymer comprising propylene (e.g., an ethylene-based propylene copolymer). In some embodiments, the thermoplastic copolymer comprises a propylene copolymer comprising ethylene (e.g., a propylene-based ethylene copolymer).

In some embodiments, the thermoplastic copolymer comprises 1% to 49% by weight of the propylene based on a total weight of the thermoplastic copolymer. In some embodiments, the thermoplastic copolymer comprises 1% to 45% by weight of the propylene based on the total weight of the thermoplastic copolymer. In some embodiments, the thermoplastic copolymer comprises 1% to 40% by weight of the propylene based on the total weight of the thermoplastic copolymer. In some embodiments, the thermoplastic copolymer comprises 1% to 35% by weight of the propylene based on the total weight of the thermoplastic copolymer. In some embodiments, the thermoplastic copolymer comprises 1% to 30% by weight of the propylene based on the total weight of the thermoplastic copolymer. In some embodiments, the thermoplastic copolymer comprises 1% to 25% by weight of the propylene based on the total weight of the thermoplastic copolymer. In some embodiments, the thermoplastic copolymer comprises 1% to 20% by weight of the propylene based on the total weight of the thermoplastic copolymer. In some embodiments, the thermoplastic copolymer comprises 1% to 15% by weight of the propylene based on the total weight of the thermoplastic copolymer. In some embodiments, the thermoplastic copolymer comprises 1% to 10% by weight of the propylene based on the total weight of the thermoplastic copolymer. In some embodiments, the thermoplastic copolymer comprises 1% to 5% by weight of the propylene based on the total weight of the thermoplastic copolymer.

In some embodiments, the thermoplastic copolymer comprises 5% to 49% by weight of the propylene based on the total weight of the thermoplastic copolymer. In some embodiments, the thermoplastic copolymer comprises 10% to 49% by weight of the propylene based on the total weight of the thermoplastic copolymer. In some embodiments, the thermoplastic copolymer comprises 15% to 49% by weight of the propylene based on the total weight of the thermoplastic copolymer. In some embodiments, the thermoplastic copolymer comprises 20% to 49% by weight of the propylene based on the total weight of the thermoplastic copolymer. In some embodiments, the thermoplastic copolymer comprises 25% to 49% by weight of the propylene based on the total weight of the thermoplastic copolymer. In some embodiments, the thermoplastic copolymer comprises 30% to 49% by weight of the propylene based on the total weight of the thermoplastic copolymer. In some embodiments, the thermoplastic copolymer comprises 35% to 49% by weight of the propylene based on the total weight of the thermoplastic copolymer. In some embodiments, the thermoplastic copolymer comprises 40% to 49% by weight of the propylene based on the total weight of the thermoplastic copolymer. In some embodiments, the thermoplastic copolymer comprises 45% to 49% by weight of the propylene based on the total weight of the thermoplastic copolymer.

In some embodiments, the thermoplastic copolymer comprises 51% to 99% by weight of the ethylene based on the total weight of the thermoplastic copolymer. In some embodiments, the thermoplastic copolymer comprises 51% to 95% by weight of the ethylene based on the total weight of the thermoplastic copolymer. In some embodiments, the thermoplastic copolymer comprises 51% to 90% by weight of the ethylene based on the total weight of the thermoplastic copolymer. In some embodiments, the thermoplastic copolymer comprises 51% to 85% by weight of the ethylene based on the total weight of the thermoplastic copolymer. In some embodiments, the thermoplastic copolymer comprises 51% to 80% by weight of the ethylene based on the total weight of the thermoplastic copolymer. In some embodiments, the thermoplastic copolymer comprises 51% to 75% by weight of the ethylene based on the total weight of the thermoplastic copolymer. In some embodiments, the thermoplastic copolymer comprises 51% to 70% by weight of the ethylene based on the total weight of the thermoplastic copolymer. In some embodiments, the thermoplastic copolymer comprises 51% to 65% by weight of the ethylene based on the total weight of the thermoplastic copolymer. In some embodiments, the thermoplastic copolymer comprises 51% to 60% by weight of the ethylene based on the total weight of the thermoplastic copolymer. In some embodiments, the thermoplastic copolymer comprises 51% to 55% by weight of the ethylene based on the total weight of the thermoplastic copolymer.

In some embodiments, the thermoplastic copolymer comprises 55% to 99% by weight of the ethylene based on the total weight of the thermoplastic copolymer. In some embodiments, the thermoplastic copolymer comprises 60% to 99% by weight of the ethylene based on the total weight of the thermoplastic copolymer. In some embodiments, the thermoplastic copolymer comprises 65% to 99% by weight of the ethylene based on the total weight of the thermoplastic copolymer. In some embodiments, the thermoplastic copolymer comprises 70% to 99% by weight of the ethylene based on the total weight of the thermoplastic copolymer. In some embodiments, the thermoplastic copolymer comprises 75% to 99% by weight of the ethylene based on the total weight of the thermoplastic copolymer. In some embodiments, the thermoplastic copolymer comprises 80% to 99% by weight of the ethylene based on the total weight of the thermoplastic copolymer. In some embodiments, the thermoplastic copolymer comprises 85% to 99% by weight of the ethylene based on the total weight of the thermoplastic copolymer. In some embodiments, the thermoplastic copolymer comprises 90% to 99% by weight of the ethylene based on the total weight of the thermoplastic copolymer. In some embodiments, the thermoplastic copolymer comprises 95% to 99% by weight of the ethylene based on the total weight of the thermoplastic copolymer.

In some embodiments, the thermoplastic copolymer comprises 1% to 49% by weight of the ethylene based on the total weight of the thermoplastic copolymer. In some embodiments, the thermoplastic copolymer comprises 1% to 45% by weight of the ethylene based on the total weight of the thermoplastic copolymer. In some embodiments, the thermoplastic copolymer comprises 1% to 40% by weight of the ethylene based on the total weight of the thermoplastic copolymer. In some embodiments, the thermoplastic copolymer comprises 1% to 35% by weight of the ethylene based on the total weight of the thermoplastic copolymer. In some embodiments, the thermoplastic copolymer comprises 1% to 30% by weight of the ethylene based on the total weight of the thermoplastic copolymer. In some embodiments, the thermoplastic copolymer comprises 1% to 25% by weight of the ethylene based on the total weight of the thermoplastic copolymer. In some embodiments, the thermoplastic copolymer comprises 1% to 20% by weight of the ethylene based on the total weight of the thermoplastic copolymer. In some embodiments, the thermoplastic copolymer comprises 1% to 15% by weight of the ethylene based on the total weight of the thermoplastic copolymer. In some embodiments, the thermoplastic copolymer comprises 1% to 10% by weight of the ethylene based on the total weight of the thermoplastic copolymer. In some embodiments, the thermoplastic copolymer comprises 1% to 5% by weight of the ethylene based on the total weight of the thermoplastic copolymer.

In some embodiments, the thermoplastic copolymer comprises 5% to 49% by weight of the ethylene based on the total weight of the thermoplastic copolymer. In some embodiments, the thermoplastic copolymer comprises 10% to 49% by weight of the ethylene based on the total weight of the thermoplastic copolymer. In some embodiments, the thermoplastic copolymer comprises 15% to 49% by weight of the ethylene based on the total weight of the thermoplastic copolymer. In some embodiments, the thermoplastic copolymer comprises 20% to 49% by weight of the ethylene based on the total weight of the thermoplastic copolymer. In some embodiments, the thermoplastic copolymer comprises 25% to 49% by weight of the ethylene based on the total weight of the thermoplastic copolymer. In some embodiments, the thermoplastic copolymer comprises 30% to 49% by weight of the ethylene based on the total weight of the thermoplastic copolymer. In some embodiments, the thermoplastic copolymer comprises 35% to 49% by weight of the ethylene based on the total weight of the thermoplastic copolymer. In some embodiments, the thermoplastic copolymer comprises 40% to 49% by weight of the ethylene based on the total weight of the thermoplastic copolymer. In some embodiments, the thermoplastic copolymer comprises 45% to 49% by weight of the ethylene based on the total weight of the thermoplastic copolymer.

In some embodiments, the thermoplastic copolymer comprises 51% to 99% by weight of the propylene based on the total weight of the thermoplastic copolymer. In some embodiments, the thermoplastic copolymer comprises 51% to 95% by weight of the propylene based on the total weight of the thermoplastic copolymer. In some embodiments, the thermoplastic copolymer comprises 51% to 90% by weight of the propylene based on the total weight of the thermoplastic copolymer. In some embodiments, the thermoplastic copolymer comprises 51% to 85% by weight of the propylene based on the total weight of the thermoplastic copolymer. In some embodiments, the thermoplastic copolymer comprises 51% to 80% by weight of the propylene based on the total weight of the thermoplastic copolymer. In some embodiments, the thermoplastic copolymer comprises 51% to 75% by weight of the propylene based on the total weight of the thermoplastic copolymer. In some embodiments, the thermoplastic copolymer comprises 51% to 70% by weight of the propylene based on the total weight of the thermoplastic copolymer. In some embodiments, the thermoplastic copolymer comprises 51% to 65% by weight of the propylene based on the total weight of the thermoplastic copolymer. In some embodiments, the thermoplastic copolymer comprises 51% to 60% by weight of the propylene based on the total weight of the thermoplastic copolymer. In some embodiments, the thermoplastic copolymer comprises 51% to 55% by weight of the propylene based on the total weight of the thermoplastic copolymer.

In some embodiments, the thermoplastic copolymer comprises 55% to 99% by weight of the propylene based on the total weight of the thermoplastic copolymer. In some embodiments, the thermoplastic copolymer comprises 60% to 99% by weight of the propylene based on the total weight of the thermoplastic copolymer. In some embodiments, the thermoplastic copolymer comprises 65% to 99% by weight of the propylene based on the total weight of the thermoplastic copolymer. In some embodiments, the thermoplastic copolymer comprises 70% to 99% by weight of the propylene based on the total weight of the thermoplastic copolymer. In some embodiments, the thermoplastic copolymer comprises 75% to 99% by weight of the propylene based on the total weight of the thermoplastic copolymer. In some embodiments, the thermoplastic copolymer comprises 80% to 99% by weight of the propylene based on the total weight of the thermoplastic copolymer. In some embodiments, the thermoplastic copolymer comprises 85% to 99% by weight of the propylene based on the total weight of the thermoplastic copolymer. In some embodiments, the thermoplastic copolymer comprises 90% to 99% by weight of the propylene based on the total weight of the thermoplastic copolymer. In some embodiments, the thermoplastic copolymer comprises 95% to 99% by weight of the propylene based on the total weight of the thermoplastic copolymer.

In some embodiments, the first layer comprises a butene-containing polymer.

In some embodiments, the first layer comprises 0.01% to 35% by weight of the butene-containing polymer based on the total weight of the first layer. In some embodiments, the first layer comprises 0.01% to 34% by weight of the butene-containing polymer based on the total weight of the first layer. In some embodiments, the first layer comprises 0.01% to 32% by weight of the butene-containing polymer based on the total weight of the first layer. In some embodiments, the first layer comprises 0.01% to 30% by weight of the butene-containing polymer based on the total weight of the first layer. In some embodiments, the first layer comprises 0.01% to 28% by weight of the butene-containing polymer based on the total weight of the first layer. In some embodiments, the first layer comprises 0.01% to 26% by weight of the butene-containing polymer based on the total weight of the first layer. In some embodiments, the first layer comprises 0.01% to 25% by weight of the butene-containing polymer based on the total weight of the first layer. In some embodiments, the first layer comprises 0.01% to 24% by weight of the butene-containing polymer based on the total weight of the first layer. In some embodiments, the first layer comprises 0.01% to 22% by weight of the butene-containing polymer based on the total weight of the first layer. In some embodiments, the first layer comprises 0.01% to 20% by weight of the butene-containing polymer based on the total weight of the first layer. In some embodiments, the first layer comprises 0.01% to 18% by weight of the butene-containing polymer based on the total weight of the first layer. In some embodiments, the first layer comprises 0.01% to 16% by weight of the butene-containing polymer based on the total weight of the first layer. In some embodiments, the first layer comprises 0.01% to 15% by weight of the butene-containing polymer based on the total weight of the first layer. In some embodiments, the first layer comprises 0.01% to 14% by weight of the butene-containing polymer based on the total weight of the first layer. In some embodiments, the first layer comprises 0.01% to 12% by weight of the butene-containing polymer based on the total weight of the first layer. In some embodiments, the first layer comprises 0.01% to 10% by weight of the butene-containing polymer based on the total weight of the first layer. In some embodiments, the first layer comprises 0.01% to 8% by weight of the butene-containing polymer based on the total weight of the first layer. In some embodiments, the first layer comprises 0.01% to 6% by weight of the butene-containing polymer based on the total weight of the first layer. In some embodiments, the first layer comprises 0.01% to 5% by weight of the butene-containing polymer based on the total weight of the first layer. In some embodiments, the first layer comprises 0.01% to 4% by weight of the butene-containing polymer based on the total weight of the first layer. In some embodiments, the first layer comprises 0.01% to 2% by weight of the butene-containing polymer based on the total weight of the first layer. In some embodiments, the first layer comprises 0.01% to 1% by weight of the butene-containing polymer based on the total weight of the first layer.

In some embodiments, the first layer comprises 1% to 35% by weight of the butene-containing polymer based on the total weight of the first layer. In some embodiments, the first layer comprises 2% to 35% by weight of the butene-containing polymer based on the total weight of the first layer. In some embodiments, the first layer comprises 4% to 35% by weight of the butene-containing polymer based on the total weight of the first layer. In some embodiments, the first layer comprises 5% to 35% by weight of the butene-containing polymer based on the total weight of the first layer. In some embodiments, the first layer comprises 6% to 35% by weight of the butene-containing polymer based on the total weight of the first layer. In some embodiments, the first layer comprises 8% to 35% by weight of the butene-containing polymer based on the total weight of the first layer. In some embodiments, the first layer comprises 10% to 35% by weight of the butene-containing polymer based on the total weight of the first layer. In some embodiments, the first layer comprises 12% to 35% by weight of the butene-containing polymer based on the total weight of the first layer. In some embodiments, the first layer comprises 14% to 35% by weight of the butene-containing polymer based on the total weight of the first layer. In some embodiments, the first layer comprises 15% to 35% by weight of the butene-containing polymer based on the total weight of the first layer. In some embodiments, the first layer comprises 16% to 35% by weight of the butene-containing polymer based on the total weight of the first layer. In some embodiments, the first layer comprises 18% to 35% by weight of the butene-containing polymer based on the total weight of the first layer. In some embodiments, the first layer comprises 20% to 35% by weight of the butene-containing polymer based on the total weight of the first layer. In some embodiments, the first layer comprises 21% to 35% by weight of the butene-containing polymer based on the total weight of the first layer. In some embodiments, the first layer comprises 22% to 35% by weight of the butene-containing polymer based on the total weight of the first layer. In some embodiments, the first layer comprises 24% to 35% by weight of the butene-containing polymer based on the total weight of the first layer. In some embodiments, the first layer comprises 25% to 35% by weight of the butene-containing polymer based on the total weight of the first layer. In some embodiments, the first layer comprises 26% to 35% by weight of the butene-containing polymer based on the total weight of the first layer. In some embodiments, the first layer comprises 28% to 35% by weight of the butene-containing polymer based on the total weight of the first layer. In some embodiments, the first layer comprises 30% to 35% by weight of the butene-containing polymer based on the total weight of the first layer. In some embodiments, the first layer comprises 32% to 35% by weight of the butene-containing polymer based on the total weight of the first layer.

In some embodiments, the butene-containing polymer comprises at least one of 1-butene, 2-butene, isobutylene, any isomers thereof, or any combination thereof. In some embodiments, for example, the butene-containing polymer comprises at least one of cis-2-butene, trans-2-butene, or any combination thereof.

In some embodiments, the butene-containing polymer comprises a polymer comprising butene. In some embodiments, the butene-containing polymer comprises at least one of 1-butene, 2-butene, isobutene, or any combination thereof. In some embodiments, the butene-containing polymer comprises at least one of polybutene, polyisobutylene, polybutylene, or any combination thereof. In some embodiments, the butene-containing polymer comprises at least one of a butene homopolymer, a butene copolymer, or any combination thereof.

In some embodiments, the butene copolymer comprises at least one of a linear copolymer, a branched copolymer, or any combination thereof. In some embodiments, the butene copolymer comprises at least one of a block copolymer, an alternating copolymer, a periodic copolymer, a stereoblock copolymer, a gradient copolymer, a graft copolymer, a star copolymer, or any combination thereof. In some embodiments, the butene copolymer comprises a butene and a second monomer unit. In some embodiments, the butene comprises at least one of 1-butene, 2-butene, isobutene, or any combination thereof. In some embodiments, the second monomer unit comprises at least one of an olefin, an alpha-olefin, or any combination thereof. In some embodiments, the second monomer unit comprises at least one of ethylene, propylene, pentene, hexene, octene, decene, dodecene, tetradecene, hexadecene, octadecene, eicosene, docosene, tetracosene, hexacosene, octacosene, triacontene, or any combination thereof. In some embodiments, the second monomer unit comprises at least one of ethylene, propylene, 1-pentene, 1-hexene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

In some embodiments, for example, the butene copolymer comprises a butene and an ethylene. In some embodiments, the butene copolymer comprises a butene and a propylene. In some embodiments, the butene copolymer comprises a copolymer of 1-butene and ethylene. In some embodiments, the butene copolymer comprises a copolymer of 1-butene and propylene. In some embodiments, the butene copolymer comprises a copolymer of 2-butene and ethylene. In some embodiments, the butene copolymer comprises a copolymer of 2-butene and propylene. In some embodiments, the butene copolymer comprises a copolymer of isobutene and ethylene. In some embodiments, the butene copolymer comprises a copolymer of isobutene and propylene. In some embodiments, the butene copolymer comprises a copolymer of a butene and a propylene. In some embodiments, the butene copolymer comprises a copolymer of a butene and an ethylene. In some embodiments, the butene copolymer comprises a copolymer of ethylene and at least one of 1-butene, 2-butene, isobutene, or any combination thereof. In some embodiments, the butene copolymer comprises a copolymer of propylene and at least one of 1-butene, 2-butene, isobutene, or any combination thereof.

In some embodiments, the butene is a major unit of the butene copolymer and the second monomer unit of the butene copolymer is a minor unit of the butene copolymer. For example, in some embodiments, the butene copolymer comprises a greater amount of the butene than at least the second monomer unit. In some embodiments, the butene copolymer comprises a greater percentage by weight of the butene than at least the second monomer unit based on a total weight of the butene copolymer. In some embodiments, the butene copolymer comprises a greater number of repeating units of butene than at least the second monomer unit. In some embodiments, a number average molecular weight of the butene is greater than a number average molecular weight of at least the second monomer unit. In some embodiments, a weight average molecular weight of the butene is greater than a weight average molecular weight of at least the second monomer unit. In some embodiments, a Z average molecular weight of the butene is greater than a Z average molecular weight of at least the second monomer unit.

In some embodiments, the butene copolymer comprises 51% to 99% by weight of the butene based on a total weight of the butene and the second monomer unit. In some embodiments, the butene copolymer comprises 51% to 95% by weight of the butene based on the total weight of the butene and the second monomer unit. In some embodiments, the butene copolymer comprises 51% to 90% by weight of the butene based on the total weight of the butene and the second monomer unit. In some embodiments, the butene copolymer comprises 51% to 85% by weight of the butene based on the total weight of the butene and the second monomer unit. In some embodiments, the butene copolymer comprises 51% to 80% by weight of the butene based on the total weight of the butene and the second monomer unit. In some embodiments, the butene copolymer comprises 51% to 75% by weight of the butene based on the total weight of the butene and the second monomer unit. In some embodiments, the butene copolymer comprises 51% to 70% by weight of the butene based on the total weight of the butene and the second monomer unit. In some embodiments, the butene copolymer comprises 51% to 65% by weight of the butene based on the total weight of the butene and the second monomer unit. In some embodiments, the butene copolymer comprises 51% to 60% by weight of the butene based on the total weight of the butene and the second monomer unit. In some embodiments, the butene copolymer comprises 51% to 55% by weight of the butene based on the total weight of the butene and the second monomer unit.

In some embodiments, the butene copolymer comprises 55% to 99% by weight of the butene based on the total weight of the butene and the second monomer unit. In some embodiments, the butene copolymer comprises 60% to 99% by weight of the butene based on the total weight of the butene and the second monomer unit. In some embodiments, the butene copolymer comprises 65% to 99% by weight of the butene based on the total weight of the butene and the second monomer unit. In some embodiments, the butene copolymer comprises 70% to 99% by weight of the butene based on the total weight of the butene and the second monomer unit. In some embodiments, the butene copolymer comprises 75% to 99% by weight of the butene based on the total weight of the butene and the second monomer unit. In some embodiments, the butene copolymer comprises 80% to 99% by weight of the butene based on the total weight of the butene and the second monomer unit. In some embodiments, the butene copolymer comprises 85% to 99% by weight of the butene based on the total weight of the butene and the second monomer unit. In some embodiments, the butene copolymer comprises 90% to 99% by weight of the butene based on the total weight of the butene and the second monomer unit. In some embodiments, the butene copolymer comprises 95% to 99% by weight of the butene based on the total weight of the butene and the second monomer unit.

In some embodiments, the butene copolymer comprises 1% to 49% by weight of the second monomer unit based on the total weight of the butene and the second monomer unit. In some embodiments, the butene copolymer comprises 1% to 45% by weight of the second monomer unit based on the total weight of the butene and the second monomer unit. In some embodiments, the butene copolymer comprises 1% to 40% by weight of the second monomer unit based on the total weight of the butene and the second monomer unit. In some embodiments, the butene copolymer comprises 1% to 35% by weight of the second monomer unit based on the total weight of the butene and the second monomer unit. In some embodiments, the butene copolymer comprises 1% to 30% by weight of the second monomer unit based on the total weight of the butene and the second monomer unit. In some embodiments, the butene copolymer comprises 1% to 25% by weight of the second monomer unit based on the total weight of the butene and the second monomer unit. In some embodiments, the butene copolymer comprises 1% to 20% by weight of the second monomer unit based on the total weight of the butene and the second monomer unit. In some embodiments, the butene copolymer comprises 1% to 15% by weight of the second monomer unit based on the total weight of the butene and the second monomer unit. In some embodiments, the butene copolymer comprises 1% to 10% by weight of the second monomer unit based on the total weight of the butene and the second monomer unit. In some embodiments, the butene copolymer comprises 1% to 5% by weight of the second monomer unit based on the total weight of the butene and the second monomer unit.

In some embodiments, the butene copolymer comprises 5% to 49% by weight of the second monomer unit based on the total weight of the butene and the second monomer unit. In some embodiments, the butene copolymer comprises 10% to 49% by weight of the second monomer unit based on the total weight of the butene and the second monomer unit. In some embodiments, the butene copolymer comprises 15% to 49% by weight of the second monomer unit based on the total weight of the butene and the second monomer unit. In some embodiments, the butene copolymer comprises 20% to 49% by weight of the second monomer unit based on the total weight of the butene and the second monomer unit. In some embodiments, the butene copolymer comprises 25% to 49% by weight of the second monomer unit based on the total weight of the butene and the second monomer unit. In some embodiments, the butene copolymer comprises 30% to 49% by weight of the second monomer unit based on the total weight of the butene and the second monomer unit. In some embodiments, the butene copolymer comprises 35% to 49% by weight of the second monomer unit based on the total weight of the butene and the second monomer unit. In some embodiments, the butene copolymer comprises 40% to 49% by weight of the second monomer unit based on the total weight of the butene and the second monomer unit. In some embodiments, the butene copolymer comprises 45% to 49% by weight of the second monomer unit based on the total weight of the butene and the second monomer unit.

In some embodiments, the butene-containing polymer is different from the thermoplastic polymer.

In some embodiments, the first layer comprises the thermoplastic polymer as a major polymer and the butene-containing polymer as a minor polymer. In some embodiments, the first layer comprises a greater amount of the thermoplastic polymer than the butene-containing polymer. In some embodiments, the first layer comprises a greater percentage by weight of the thermoplastic polymer than the butene-containing polymer, wherein the weight percentage is based on a total weight of the thermoplastic polymer and the butene-containing polymer. In some embodiments, the first layer comprises a greater percentage by weight of the thermoplastic polymer than the butene-containing polymer, wherein the weight percentage is based on a total weight of the first layer.

In some embodiments, the first layer comprises 51% to 99% by weight of the thermoplastic polymer based on the total weight of the thermoplastic polymer and the butene-containing polymer. In some embodiments, the first layer comprises 51% to 95% by weight of the thermoplastic polymer based on the total weight of the thermoplastic polymer and the butene-containing polymer. In some embodiments, the first layer comprises 51% to 90% by weight of the thermoplastic polymer based on the total weight of the thermoplastic polymer and the butene-containing polymer. In some embodiments, the first layer comprises 51% to 85% by weight of the thermoplastic polymer based on the total weight of the thermoplastic polymer and the butene-containing polymer. In some embodiments, the first layer comprises 51% to 80% by weight of the thermoplastic polymer based on the total weight of the thermoplastic polymer and the butene-containing polymer. In some embodiments, the first layer comprises 51% to 75% by weight of the thermoplastic polymer based on the total weight of the thermoplastic polymer and the butene-containing polymer. In some embodiments, the first layer comprises 51% to 70% by weight of the thermoplastic polymer based on the total weight of the thermoplastic polymer and the butene-containing polymer. In some embodiments, the first layer comprises 51% to 65% by weight of the thermoplastic polymer based on the total weight of the thermoplastic polymer and the butene-containing polymer. In some embodiments, the first layer comprises 51% to 60% by weight of the thermoplastic polymer based on the total weight of the thermoplastic polymer and the butene-containing polymer. In some embodiments, the first layer comprises 51% to 55% by weight of the thermoplastic polymer based on the total weight of the thermoplastic polymer and the butene-containing polymer. In some embodiments, the weight percentage is based on the total weight of the first layer.

In some embodiments, the first layer comprises 55% to 99% by weight of the thermoplastic polymer based on the total weight of the thermoplastic polymer and the butene-containing polymer. In some embodiments, the first layer comprises 60% to 99% by weight of the thermoplastic polymer based on the total weight of the thermoplastic polymer and the butene-containing polymer. In some embodiments, the first layer comprises 65% to 99% by weight of the thermoplastic polymer based on the total weight of the thermoplastic polymer and the butene-containing polymer. In some embodiments, the first layer comprises 70% to 99% by weight of the thermoplastic polymer based on the total weight of the thermoplastic polymer and the butene-containing polymer. In some embodiments, the first layer comprises 75% to 99% by weight of the thermoplastic polymer based on the total weight of the thermoplastic polymer and the butene-containing polymer. In some embodiments, the first layer comprises 80% to 99% by weight of the thermoplastic polymer based on the total weight of the thermoplastic polymer and the butene-containing polymer. In some embodiments, the first layer comprises 85% to 99% by weight of the thermoplastic polymer based on the total weight of the thermoplastic polymer and the butene-containing polymer. In some embodiments, the first layer comprises 90% to 99% by weight of the thermoplastic polymer based on the total weight of the thermoplastic polymer and the butene-containing polymer. In some embodiments, the first layer comprises 95% to 99% by weight of the thermoplastic polymer based on the total weight of the thermoplastic polymer and the butene-containing polymer. In some embodiments, the weight percentage is based on the total weight of the first layer.

In some embodiments, the first layer comprises 1% to 49% by weight of the butene-containing polymer based on the total weight of the thermoplastic polymer and the butene-containing polymer. In some embodiments, the first layer comprises 1% to 45% by weight of the butene-containing polymer based on the total weight of the thermoplastic polymer and the butene-containing polymer. In some embodiments, the first layer comprises 1% to 40% by weight of the butene-containing polymer based on the total weight of the thermoplastic polymer and the butene-containing polymer. In some embodiments, the first layer comprises 1% to 35% by weight of the butene-containing polymer based on the total weight of the thermoplastic polymer and the butene-containing polymer. In some embodiments, the first layer comprises 1% to 30% by weight of the butene-containing polymer based on the total weight of the thermoplastic polymer and the butene-containing polymer. In some embodiments, the first layer comprises 1% to 25% by weight of the butene-containing polymer based on the total weight of the thermoplastic polymer and the butene-containing polymer. In some embodiments, the first layer comprises 1% to 20% by weight of the butene-containing polymer based on the total weight of the thermoplastic polymer and the butene-containing polymer. In some embodiments, the first layer comprises 1% to 15% by weight of the butene-containing polymer based on the total weight of the thermoplastic polymer and the butene-containing polymer. In some embodiments, the first layer comprises 1% to 10% by weight of the butene-containing polymer based on the total weight of the thermoplastic polymer and the butene-containing polymer. In some embodiments, the first layer comprises 1% to 5% by weight of the butene-containing polymer based on the total weight of the thermoplastic polymer and the butene-containing polymer. In some embodiments, the weight percentage is based on the total weight of the first layer.

In some embodiments, the first layer comprises 5% to 49% by weight of the butene-containing polymer based on the total weight of the thermoplastic polymer and the butene-containing polymer. In some embodiments, the first layer comprises 10% to 49% by weight of the butene-containing polymer based on the total weight of the thermoplastic polymer and the butene-containing polymer. In some embodiments, the first layer comprises 15% to 49% by weight of the butene-containing polymer based on the total weight of the thermoplastic polymer and the butene-containing polymer. In some embodiments, the first layer comprises 20% to 49% by weight of the butene-containing polymer based on the total weight of the thermoplastic polymer and the butene-containing polymer. In some embodiments, the first layer comprises 25% to 49% by weight of the butene-containing polymer based on the total weight of the thermoplastic polymer and the butene-containing polymer. In some embodiments, the first layer comprises 30% to 49% by weight of the butene-containing polymer based on the total weight of the thermoplastic polymer and the butene-containing polymer. In some embodiments, the first layer comprises 35% to 49% by weight of the butene-containing polymer based on the total weight of the thermoplastic polymer and the butene-containing polymer. In some embodiments, the first layer comprises 40% to 49% by weight of the butene-containing polymer based on the total weight of the thermoplastic polymer and the butene-containing polymer. In some embodiments, the first layer comprises 45% to 49% by weight of the butene-containing polymer based on the total weight of the thermoplastic polymer and the butene-containing polymer. In some embodiments, the weight percentage is based on the total weight of the first layer.

In some embodiments, the first layer comprises at least one filler.

In some embodiments, the first layer comprises 0.01% to 10% by weight of the at least one filler based on the total weight of the first layer. In some embodiments, the first layer comprises 0.01% to 9% by weight of the at least one filler based on the total weight of the first layer. In some embodiments, the first layer comprises 0.01% to 8% by weight of the at least one filler based on the total weight of the first layer. In some embodiments, the first layer comprises 0.01% to 7% by weight of the at least one filler based on the total weight of the first layer. In some embodiments, the first layer comprises 0.01% to 6% by weight of the at least one filler based on the total weight of the first layer. In some embodiments, the first layer comprises 0.01% to 5% by weight of the at least one filler based on the total weight of the first layer. In some embodiments, the first layer comprises 0.01% to 4% by weight of the at least one filler based on the total weight of the first layer. In some embodiments, the first layer comprises 0.01% to 3% by weight of the at least one filler based on the total weight of the first layer. In some embodiments, the first layer comprises 0.01% to 2% by weight of the at least one filler based on the total weight of the first layer. In some embodiments, the first layer comprises 0.01% to 1% by weight of the at least one filler based on the total weight of the first layer.

In some embodiments, the first layer comprises 0.1% to 10% by weight of the at least one filler based on the total weight of the first layer. In some embodiments, the first layer comprises 1% to 10% by weight of the at least one filler based on the total weight of the first layer. In some embodiments, the first layer comprises 2% to 10% by weight of the at least one filler based on the total weight of the first layer. In some embodiments, the first layer comprises 3% to 10% by weight of the at least one filler based on the total weight of the first layer. In some embodiments, the first layer comprises 4% to 10% by weight of the at least one filler based on the total weight of the first layer. In some embodiments, the first layer comprises 5% to 10% by weight of the at least one filler based on the total weight of the first layer. In some embodiments, the first layer comprises 6% to 10% by weight of the at least one filler based on the total weight of the first layer. In some embodiments, the first layer comprises 7% to 10% by weight of the at least one filler based on the total weight of the first layer. In some embodiments, the first layer comprises 8% to 10% by weight of the at least one filler based on the total weight of the first layer.

In some embodiments, the first layer comprises 9% to 10% by weight of the at least one filler based on the total weight of the first layer.

In some embodiments, the at least one filler comprises at least one of nepheline syenite, calcium carbonate, barium sulfate, iron oxide, diatomaceous earth, an antiblock additive, melamine, quartz, silica, colloidal silica, crystalline silica, precipitated silica, amorphous silica, titanium dioxide, fumed silica, alumina trihydrate, zinc oxide, zirconium oxide, zirconium silicate, treated silica, zinc borate, chromic oxide, crystalline silica fine powder, amorphous silica fine powder, silicone rubber powder, glass, glass bubbles, glass powder, zeolites, silica hydrogen, silica aero gel, calcium silicate, aluminum silicate, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum or talc, slaked lime, or any combination thereof.

In some embodiments, the first layer has a thickness of 1 mil to 200 mils. In some embodiments, the first layer has a thickness of 1 mil to 190 mils. In some embodiments, the first layer has a thickness of 1 mil to 180 mils. In some embodiments, the first layer has a thickness of 1 mil to 170 mils. In some embodiments, the first layer has a thickness of 1 mil to 160 mils. In some embodiments, the first layer has a thickness of 1 mil to 150 mils. In some embodiments, the first layer has a thickness of 1 mil to 140 mils. In some embodiments, the first layer has a thickness of 1 mil to 130 mils. In some embodiments, the first layer has a thickness of 1 mil to 120 mils. In some embodiments, the first layer has a thickness of 1 mil to 110 mils. In some embodiments, the first layer has a thickness of 1 mil to 100 mils. In some embodiments, the first layer has a thickness of 1 mil to 90 mils. In some embodiments, the first layer has a thickness of 1 mil to 80 mils. In some embodiments, the first layer has a thickness of 1 mil to 70 mils. In some embodiments, the first layer has a thickness of 1 mil to 60 mils. In some embodiments, the first layer has a thickness of 1 mil to 50 mils. In some embodiments, the first layer has a thickness of 1 mil to 40 mils. In some embodiments, the first layer has a thickness of 1 mil to 30 mils. In some embodiments, the first layer has a thickness of 1 mil to 20 mils. In some embodiments, the first layer has a thickness of 1 mil to 10 mils.

In some embodiments, the first layer has a thickness of 10 mils to 200 mils. In some embodiments, the first layer has a thickness of 20 mils to 200 mils. In some embodiments, the first layer has a thickness of 30 mils to 200 mils. In some embodiments, the first layer has a thickness of 40 mils to 200 mils. In some embodiments, the first layer has a thickness of 50 mils to 200 mils. In some embodiments, the first layer has a thickness of 60 mils to 200 mils. In some embodiments, the first layer has a thickness of 70 mils to 200 mils. In some embodiments, the first layer has a thickness of 80 mils to 200 mils. In some embodiments, the first layer has a thickness of 90 mils to 200 mils. In some embodiments, the first layer has a thickness of 100 mils to 200 mils. In some embodiments, the first layer has a thickness of 110 mils to 200 mils. In some embodiments, the first layer has a thickness of 120 mils to 200 mils. In some embodiments, the first layer has a thickness of 130 mils to 200 mils. In some embodiments, the first layer has a thickness of 140 mils to 200 mils. In some embodiments, the first layer has a thickness of 150 mils to 200 mils. In some embodiments, the first layer has a thickness of 160 mils to 200 mils. In some embodiments, the first layer has a thickness of 170 mils to 200 mils. In some embodiments, the first layer has a thickness of 180 mils to 200 mils. In some embodiments, the first layer has a thickness of 190 mils to 200 mils.

In some embodiments, the roofing material comprises a reinforcement layer. In some embodiments, the roofing material does not comprise a reinforcement layer.

In some embodiments, the reinforcement layer is embedded in the first layer. In some embodiments, the reinforcement layer is located on a bottom surface of the first layer. In some embodiments, the first layer is located on a top surface of the reinforcement layer. In some embodiments, the first layer directly contacts a top surface of the reinforcement layer. In some embodiments, the first layer is located on a bottom surface of the reinforcement layer. In some embodiments, the first layer directly contacts a bottom surface of the reinforcement layer. In some embodiments, the first layer impregnates the reinforcement layer. In some embodiments, the reinforcement layer is located on a top surface of the first layer. In some embodiments, the reinforcement layer is located between the first layer and a second layer. In some embodiments, the reinforcement layer directly contacts the first layer and the second layer. In some embodiments, an intervening layer is located between the reinforcement layer and the first layer. In some embodiments, the intervening layer is located between the reinforcement layer and the second layer. In some embodiments, the roofing material does not comprise the reinforcement layer.

In some embodiments, the reinforcement layer comprises at least one of a substrate, a support layer, an asphaltic substrate, a plywood substrate, a glass substrate, a cellulosic substrate, an underlayment, a roofing substrate, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a cement board, concrete, a base sheet, a pipe, a chimney, a wax paper, a roof shingle, a mesh, a fleece, a mat, a fabric, a glass mat, a fiberglass mat, a woven mat, a nonwoven mat, a polyester mat, a scrim, a coated scrim, a spunbond mat, a spunlaced mat, an airlaid mat, a meltblown mat, or any combination thereof. In some embodiments, the reinforcement layer comprises a fibrous material, wherein the fibrous material comprises at least one of a natural fiber, a synthetic fiber, or any combination thereof. In some embodiments, the reinforcement layer comprises at least one of a polyolefin (e.g., at least one of a polyethylene, a polypropylene, any copolymer thereof, any blend thereof, or any combination thereof), a polyester, a polyamide, a glass, a fiberglass, or any combination thereof.

In some embodiments, the reinforcement layer has a thickness of 1 mil to 200 mils. In some embodiments, the reinforcement layer has a thickness of 10 mils to 200 mils. In some embodiments, the reinforcement layer has a thickness of 20 mils to 200 mils. In some embodiments, the reinforcement layer has a thickness of 30 mils to 200 mils. In some embodiments, the reinforcement layer has a thickness of 40 mils to 200 mils. In some embodiments, the reinforcement layer has a thickness of 50 mils to 200 mils. In some embodiments, the reinforcement layer has a thickness of 60 mils to 200 mils. In some embodiments, the reinforcement layer has a thickness of 70 mils to 200 mils. In some embodiments, the reinforcement layer has a thickness of 80 mils to 200 mils. In some embodiments, the reinforcement layer has a thickness of 90 mils to 200 mils.

In some embodiments, the reinforcement layer has a thickness of 100 mils to 200 mils. In some embodiments, the reinforcement layer has a thickness of 110 mils to 200 mils. In some embodiments, the reinforcement layer has a thickness of 120 mils to 200 mils. In some embodiments, the reinforcement layer has a thickness of 130 mils to 200 mils. In some embodiments, the reinforcement layer has a thickness of 140 mils to 200 mils. In some embodiments, the reinforcement layer has a thickness of 150 mils to 200 mils. In some embodiments, the reinforcement layer has a thickness of 160 mils to 200 mils. In some embodiments, the reinforcement layer has a thickness of 170 mils to 200 mils. In some embodiments, the reinforcement layer has a thickness of 180 mils to 200 mils. In some embodiments, the reinforcement layer has a thickness of 190 mils to 200 mils.

In some embodiments, the reinforcement layer has a thickness of 1 mil to 190 mils. In some embodiments, the reinforcement layer has a thickness of 1 mil to 180 mils. In some embodiments, the reinforcement layer has a thickness of 1 mil to 170 mils. In some embodiments, the reinforcement layer has a thickness of 1 mil to 160 mils. In some embodiments, the reinforcement layer has a thickness of 1 mil to 150 mils. In some embodiments, the reinforcement layer has a thickness of 1 mil to 140 mils. In some embodiments, the reinforcement layer has a thickness of 1 mil to 130 mils. In some embodiments, the reinforcement layer has a thickness of 1 mil to 120 mils. In some embodiments, the reinforcement layer has a thickness of 1 mil to 110 mils. In some embodiments, the reinforcement layer has a thickness of 1 mil to 100 mils. In some embodiments, the reinforcement layer has a thickness of 1 mil to 90 mils. In some embodiments, the reinforcement layer has a thickness of 1 mil to 80 mils. In some embodiments, the reinforcement layer has a thickness of 1 mil to 70 mils. In some embodiments, the reinforcement layer has a thickness of 1 mil to 60 mils. In some embodiments, the reinforcement layer has a thickness of 1 mil to 50 mils. In some embodiments, the reinforcement layer has a thickness of 1 mil to 40 mils. In some embodiments, the reinforcement layer has a thickness of 1 mil to 30 mils. In some embodiments, the reinforcement layer has a thickness of 1 mil to 20 mils. In some embodiments, the reinforcement layer has a thickness of 1 mil to 10 mils.

In some embodiments, the roofing material comprises an adhesive layer.

In some embodiments, the adhesive layer is located on the reinforcement layer. In some embodiments, the reinforcement layer is located between the adhesive layer and the first layer. In some embodiments, the adhesive layer directly contacts the reinforcement layer. In some embodiments, the adhesive layer covers a portion of the reinforcement layer. In some embodiments, the adhesive layer covers at least a portion of the reinforcement layer. In some embodiments, the adhesive layer covers the reinforcement layer in its entirety. In some embodiments, the adhesive layer is bonded to the reinforcement layer. In some embodiments, the adhesive layer is adhered to the reinforcement layer. In some embodiments, the adhesive layer impregnates the reinforcement layer. In some embodiments, the adhesive layer is pressed, under heat and/or pressure, into the reinforcement layer. In some embodiments, the adhesive layer is laminated to the reinforcement layer. In some embodiments, an intervening layer is located between the adhesive layer and the reinforcement layer.

In some embodiments, the adhesive layer is located on the first layer. In some embodiments, the adhesive layer directly contacts the first layer. In some embodiments, the adhesive layer covers a portion of the first layer. In some embodiments, the adhesive layer covers at least a portion of the first layer. In some embodiments, the adhesive layer covers the first layer in its entirety. In some embodiments, the adhesive layer is bonded to the first layer. In some embodiments, the adhesive layer is adhered to the first layer. In some embodiments, the adhesive layer impregnates the first layer. In some embodiments, the adhesive layer is pressed, under heat and/or pressure, into the first layer. In some embodiments, the adhesive layer is laminated to the first layer. In some embodiments, an intervening layer is located between the adhesive layer and the first layer.

In some embodiments, the adhesive layer has a thickness of 1 mil to 200 mils. In some embodiments, the adhesive layer has a thickness of 10 mil to 200 mils. In some embodiments, the adhesive layer has a thickness of 20 mil to 200 mils. In some embodiments, the adhesive layer has a thickness of 30 mil to 200 mils. In some embodiments, the adhesive layer has a thickness of 40 mil to 200 mils. In some embodiments, the adhesive layer has a thickness of 50 mil to 200 mils. In some embodiments, the adhesive layer has a thickness of 60 mil to 200 mils. In some embodiments, the adhesive layer has a thickness of 70 mil to 200 mils. In some embodiments, the adhesive layer has a thickness of 80 mil to 200 mils. In some embodiments, the adhesive layer has a thickness of 90 mil to 200 mils. In some embodiments, the adhesive layer has a thickness of 100 mil to 200 mils. In some embodiments, the adhesive layer has a thickness of 110 mil to 200 mils. In some embodiments, the adhesive layer has a thickness of 120 mil to 200 mils. In some embodiments, the adhesive layer has a thickness of 130 mil to 200 mils. In some embodiments, the adhesive layer has a thickness of 140 mil to 200 mils. In some embodiments, the adhesive layer has a thickness of 150 mil to 200 mils. In some embodiments, the adhesive layer has a thickness of 160 mil to 200 mils. In some embodiments, the adhesive layer has a thickness of 170 mil to 200 mils. In some embodiments, the adhesive layer has a thickness of 180 mil to 200 mils. In some embodiments, the adhesive layer has a thickness of 190 mil to 200 mils.

In some embodiments, the adhesive layer has a thickness of 1 mil to 190 mils. In some embodiments, the adhesive layer has a thickness of 1 mil to 180 mils. In some embodiments, the adhesive layer has a thickness of 1 mil to 170 mils. In some embodiments, the adhesive layer has a thickness of 1 mil to 160 mils. In some embodiments, the adhesive layer has a thickness of 1 mil to 150 mils. In some embodiments, the adhesive layer has a thickness of 1 mil to 140 mils. In some embodiments, the adhesive layer has a thickness of 1 mil to 130 mils. In some embodiments, the adhesive layer has a thickness of 1 mil to 120 mils. In some embodiments, the adhesive layer has a thickness of 1 mil to 110 mils. In some embodiments, the adhesive layer has a thickness of 1 mil to 100 mils. In some embodiments, the adhesive layer has a thickness of 1 mil to 90 mils. In some embodiments, the adhesive layer has a thickness of 1 mil to 80 mils. In some embodiments, the adhesive layer has a thickness of 1 mil to 70 mils. In some embodiments, the adhesive layer has a thickness of 1 mil to 60 mils. In some embodiments, the adhesive layer has a thickness of 1 mil to 50 mils. In some embodiments, the adhesive layer has a thickness of 1 mil to 40 mils. In some embodiments, the adhesive layer has a thickness of 1 mil to 30 mils. In some embodiments, the adhesive layer has a thickness of 1 mil to 20 mils. In some embodiments, the adhesive layer has a thickness of 1 mil to 10 mils.

In some embodiments, the adhesive layer comprises at least one adhesive. In some embodiments, the at least one adhesive comprises at least one of a hot melt adhesive, a solvent-based adhesive, a pressure sensitive adhesive, a water-based adhesive, a UV cured or UV curable polymer, or any combination thereof. In some embodiments, the at least one adhesive comprises at least one of an asphaltic adhesive, a butyl adhesive, a silicone adhesive, an acrylic adhesive, a synthetic thermoplastic elastomer, a natural rubber, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof. In some embodiments, the at least one adhesive comprises at one elastomer. In some embodiments, the at least one elastomer comprises at least one of a butyl rubber, a styrenic block copolymer, or any combination thereof. In some embodiments, the at least one adhesive comprises at least one of an acrylic adhesive, a water-based acrylic adhesive, or any combination thereof.

In some embodiments, the at least one adhesive comprises at least one of an asphaltic adhesive, a butyl adhesive, a silicone adhesive, an epoxy adhesive, a polyurethane adhesive, an acrylic adhesive, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymer, an acrylic copolymer, (e.g., at least one of vinyl acetate acrylic, ethylene vinyl acetate, an ethylene acrylic, styrene acrylic, vinyl chloride acrylic, vinyl versatate, or any combination thereof), a silyl modified polymer, a silane terminated polymer, natural rubber, a polyolefin polymer, a poly-alpha-olefin (APAO/APO) polymer, a polyamide polyvinyl acetate, a polyvinyl alcohol, a polyamide, a polyester, a polyester amide, or any combination thereof.

In some embodiments, the roofing material comprises a release liner.

In some embodiments, the release liner covers a portion of the adhesive layer. In some embodiments, the release liner covers at least a portion of the adhesive layer. In some embodiments, the release liner covers the adhesive layer in its entirety. In some embodiments, the release liner covers the adhesive layer.

In some embodiments, the roofing material has a thickness of 10 mils to 500 mils. In some embodiments, the roofing material has a thickness of 10 mils to 475 mils. In some embodiments, the roofing material has a thickness of 10 mils to 450 mils. In some embodiments, the roofing material has a thickness of 10 mils to 425 mils. In some embodiments, the roofing material has a thickness of 10 mils to 400 mils. In some embodiments, the roofing material has a thickness of 10 mils to 375 mils. In some embodiments, the roofing material has a thickness of 10 mils to 350 mils. In some embodiments, the roofing material has a thickness of 10 mils to 325 mils. In some embodiments, the roofing material has a thickness of 10 mils to 300 mils. In some embodiments, the roofing material has a thickness of 10 mils to 275 mils. In some embodiments, the roofing material has a thickness of 10 mils to 250 mils. In some embodiments, the roofing material has a thickness of 10 mils to 225 mils. In some embodiments, the roofing material has a thickness of 10 mils to 200 mils. In some embodiments, the roofing material has a thickness of 10 mils to 175 mils. In some embodiments, the roofing material has a thickness of 10 mils to 150 mils. In some embodiments, the roofing material has a thickness of 10 mils to 125 mils. In some embodiments, the roofing material has a thickness of 10 mils to 100 mils. In some embodiments, the roofing material has a thickness of 10 mils to 75 mils. In some embodiments, the roofing material has a thickness of 10 mils to 50 mils. In some embodiments, the roofing material has a thickness of 10 mils to 25 mils.

In some embodiments, the roofing material has a thickness of 25 mils to 500 mils. In some embodiments, the roofing material has a thickness of 50 mils to 500 mils. In some embodiments, the roofing material has a thickness of 75 mils to 500 mils. In some embodiments, the roofing material has a thickness of 100 mils to 500 mils. In some embodiments, the roofing material has a thickness of 125 mils to 500 mils. In some embodiments, the roofing material has a thickness of 150 mils to 500 mils. In some embodiments, the roofing material has a thickness of 175 mils to 500 mils. In some embodiments, the roofing material has a thickness of 200 mils to 500 mils. In some embodiments, the roofing material has a thickness of 225 mils to 500 mils. In some embodiments, the roofing material has a thickness of 250 mils to 500 mils. In some embodiments, the roofing material has a thickness of 275 mils to 500 mils. In some embodiments, the roofing material has a thickness of 300 mils to 500 mils. In some embodiments, the roofing material has a thickness of 325 mils to 500 mils. In some embodiments, the roofing material has a thickness of 350 mils to 500 mils. In some embodiments, the roofing material has a thickness of 375 mils to 500 mils. In some embodiments, the roofing material has a thickness of 400 mils to 500 mils. In some embodiments, the roofing material has a thickness of 425 mils to 500 mils. In some embodiments, the roofing material has a thickness of 450 mils to 500 mils. In some embodiments, the roofing material has a thickness of 475 mils to 500 mils.

FIG. 1 is a schematic diagram of a cross-section of a roofing material 100, according to some embodiments. As shown in FIG. 1, in some embodiments, the roofing material 100 comprises a first layer 102. In some embodiments, the roofing material 100 comprises an adhesive layer 104. In some embodiments, the roofing material 100 comprises a release liner 106. In some embodiments, the roofing material 100 comprises a reinforcement layer (not shown). In some embodiments, the roofing material 100 does not comprise a reinforcement layer. In some embodiments, the roofing material 100 does not comprise the release liner 106. It will be appreciated that any one or more of the roofing materials, the first layers, the adhesive layers, the release liners, and/or the reinforcement layers disclosed herein may be used, without departing from the scope of this disclosure. For simplicity, the roofing materials, the first layers, the adhesive layers, the release liners, and/or the reinforcement layers are not repeated here.

In some embodiments, the adhesive layer 104 is located on the first layer 102. In some embodiments, the adhesive layer 104 is located between the first layer 102 and the release liner 106. In some embodiments, the adhesive layer 104 directly contacts the first layer 102. In some embodiments, the adhesive layer 104 directly contacts the release liner 106. In some embodiments, the adhesive layer 104 covers the first layer 102. In some embodiments, the adhesive layer 104 covers a portion of the first layer 102. In some embodiments, the adhesive layer 104 covers at least a portion of the first layer 102. In some embodiments, the adhesive layer 104 covers the first layer 102 in its entirety. In some embodiments, the adhesive layer 104 is bonded to the first layer 102. In some embodiments, the adhesive layer 104 is adhered to the first layer 102. In some embodiments, an intervening layer is located between the cured coating 104 and substrate 102. In some embodiments, when the roofing material 100 is installed on a roofing substrate, the adhesive layer 104 is located between the first layer 102 and the roofing substrate.

Figure 2:
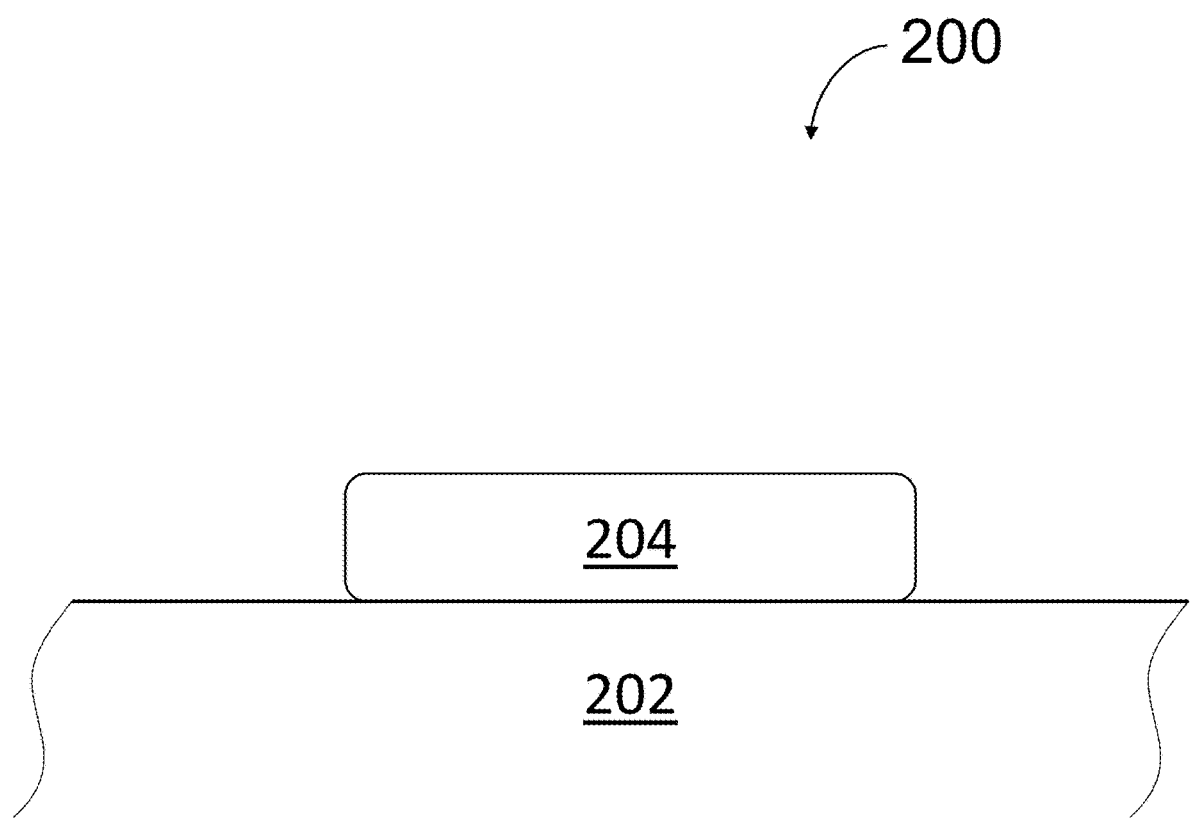
FIG. 2 is a schematic diagram of a cross-section of a roofing system, according to some embodiments.

FIG. 2 is a schematic diagram of a cross-section of a roofing system 200, according to some embodiments. As shown in FIG. 2, in some embodiments, the roofing system 200 comprises a roofing substrate 202. In some embodiments, the roofing substrate 202 comprises at least one of a roof deck, an oriented strand board (OSB), or any combination thereof. In some embodiments, the roofing substrate 202 comprises a roof deck of a vehicle, such as, for example and without limitation, at least one of a motor vehicle, a recreational vehicle, an automotive vehicle, or any combination thereof. In some embodiments, the roofing substrate 202 comprises at least one of an asphaltic substrate, a plywood substrate, a glass substrate, a cellulosic substrate, an underlayment, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a cement board, concrete, a base sheet, a pipe, a chimney, a wax paper, a roof shingle, a mesh, a fleece, a mat, a fabric, a glass mat, a fiberglass mat, a woven mat, a nonwoven mat, a polyester mat, a scrim, a coated scrim, a spunbond mat, a spunlaced mat, an airlaid mat, a meltblown mat, or any combination thereof.

In some embodiments, the roofing system 200 comprises a roofing material 204. In some embodiments, the roofing material 204 is located on the roofing substrate 202. In some embodiments, the roofing material 204 directly contacts the roofing substrate 202. In some embodiments, the roofing material 204 is adhered to the roofing substrate 202. In some embodiments, the roofing material 204 is bonded to the roofing substrate 202. In some embodiments, the roofing material 204 is fastened to the roofing substrate 202. In some embodiments, the roofing material 204 is mechanically fastened to the roofing substrate 202. In some embodiments, the roofing material 204 is secured to the roofing substrate 202. In some embodiments, the roofing material 204 is attached to the roofing substrate 202. In some embodiments, the roofing material 204 covers the roofing substrate 202. In some embodiments, an intervening layer is located between the roofing material 204 and the roofing substrate 202. It will be appreciated that any one or more of the roofing materials disclosed herein may be used, without departing from the scope of this disclosure. For simplicity, the roofing materials are not repeated here.

In some embodiments, a peel strength between the roofing material 204 and the roofing substrate 202 is 3 PLI to 20 PLI as measured according to ASTM D413. In some embodiments, a peel strength between the roofing material 204 and the roofing substrate 202 is 4 PLI to 20 PLI as measured according to ASTM D413. In some embodiments, a peel strength between the roofing material 204 and the roofing substrate 202 is 5 PLI to 20 PLI as measured according to ASTM D413. In some embodiments, a peel strength between the roofing material 204 and the roofing substrate 202 is 6 PLI to 20 PLI as measured according to ASTM D413. In some embodiments, a peel strength between the roofing material 204 and the roofing substrate 202 is 7 PLI to 20 PLI as measured according to ASTM D413. In some embodiments, a peel strength between the roofing material 204 and the roofing substrate 202 is 8 PLI to 20 PLI as measured according to ASTM D413. In some embodiments, a peel strength between the roofing material 204 and the roofing substrate 202 is 9 PLI to 20 PLI as measured according to ASTM D413. In some embodiments, a peel strength between the roofing material 204 and the roofing substrate 202 is 10 PLI to 20 PLI as measured according to ASTM D413. In some embodiments, a peel strength between the roofing material 204 and the roofing substrate 202 is 15 PLI to 20 PLI as measured according to ASTM D413.

In some embodiments, a peel strength between the roofing material 204 and the roofing substrate 202 is 4 PLI to 15 PLI as measured according to ASTM D413. In some embodiments, a peel strength between the roofing material 204 and the roofing substrate 202 is 4 PLI to 14 PLI as measured according to ASTM D413. In some embodiments, a peel strength between the roofing material 204 and the roofing substrate 202 is 4 PLI to 13 PLI as measured according to ASTM D413. In some embodiments, a peel strength between the roofing material 204 and the roofing substrate 202 is 4 PLI to 12 PLI as measured according to ASTM D413. In some embodiments, a peel strength between the roofing material 204 and the roofing substrate 202 is 4 PLI to 11 PLI as measured according to ASTM D413. In some embodiments, a peel strength between the roofing material 204 and the roofing substrate 202 is 4 PLI to 10 PLI as measured according to ASTM D413.

In some embodiments, a peel strength between the roofing material 204 and the roofing substrate 202 is 5 PLI to 15 PLI as measured according to ASTM D413. In some embodiments, a peel strength between the roofing material 204 and the roofing substrate 202 is 5 PLI to 14 PLI as measured according to ASTM D413. In some embodiments, a peel strength between the roofing material 204 and the roofing substrate 202 is 5 PLI to 13 PLI as measured according to ASTM D413. In some embodiments, a peel strength between the roofing material 204 and the roofing substrate 202 is 5 PLI to 12 PLI as measured according to ASTM D413. In some embodiments, a peel strength between the roofing material 204 and the roofing substrate 202 is 5 PLI to 11 PLI as measured according to ASTM D413. In some embodiments, a peel strength between the roofing material 204 and the roofing substrate 202 is 5 PLI to 10 PLI as measured according to ASTM D413.

In some embodiments, a peel strength between the roofing material 204 and the roofing substrate 202 is 6 PLI to 15 PLI as measured according to ASTM D413. In some embodiments, a peel strength between the roofing material 204 and the roofing substrate 202 is 6 PLI to 14 PLI as measured according to ASTM D413. In some embodiments, a peel strength between the roofing material 204 and the roofing substrate 202 is 6 PLI to 13 PLI as measured according to ASTM D413. In some embodiments, a peel strength between the roofing material 204 and the roofing substrate 202 is 6 PLI to 12 PLI as measured according to ASTM D413. In some embodiments, a peel strength between the roofing material 204 and the roofing substrate 202 is 6 PLI to 11 PLI as measured according to ASTM D413. In some embodiments, a peel strength between the roofing material 204 and the roofing substrate 202 is 6 PLI to 10 PLI as measured according to ASTM D413.

As used herein, a wind uplift resistance is measured according to "FM Approvals® method, Procedure Name: 12×24 ft Wind Uplift Tests using Positive Static Pressure, Procedure No: 4450, 4470, 4474, Revision No: 1 Date: Sep. 25, 2008" (hereinafter, "the 12×24 ft Wind Uplift Test") at 23° C. and 50% relative humidity. The 12×24 ft Wind Uplift Test is incorporated herein by reference in its entirety for all purposes.

In some embodiments, the roofing system 200 exhibits a wind uplift resistance of 100 psf to 250 psf as measured according to the 12×24 ft Wind Uplift Test at 23° C. and 50% relative humidity. For example, in some embodiments, the roofing system 200 exhibits a wind uplift resistance of 100 psf to 240 psf as measured according to the 12×24 ft Wind Uplift Test at 23° C. and 50% relative humidity. In some embodiments, the roofing system 200 exhibits a wind uplift resistance of 100 psf to 230 psf as measured according to the 12×24 ft Wind Uplift Test at 23° C. and 50% relative humidity. In some embodiments, the roofing system 200 exhibits a wind uplift resistance of 100 psf to 220 psf as measured according to the 12×24 ft Wind Uplift Test at 23° C. and 50% relative humidity. In some embodiments, the roofing system 200 exhibits a wind uplift resistance of 100 psf to 210 psf as measured according to the 12×24 ft Wind Uplift Test at 23° C. and 50% relative humidity. In some embodiments, the roofing system 200 exhibits a wind uplift resistance of 100 psf to 200 psf as measured according to the 12×24 ft Wind Uplift Test at 23° C. and 50% relative humidity. In some embodiments, the roofing system 200 exhibits a wind uplift resistance of 100 psf to 190 psf as measured according to the 12×24 ft Wind Uplift Test at 23° C. and 50% relative humidity. In some embodiments, the roofing system 200 exhibits a wind uplift resistance of 100 psf to 180 psf as measured according to the 12×24 ft Wind Uplift Test at 23° C. and 50% relative humidity. In some embodiments, the roofing system 200 exhibits a wind uplift resistance of 100 psf to 170 psf as measured according to the 12×24 ft Wind Uplift Test at 23° C. and 50% relative humidity. In some embodiments, the roofing system 200 exhibits a wind uplift resistance of 100 psf to 160 psf as measured according to the 12×24 ft Wind Uplift Test at 23° C. and 50% relative humidity. In some embodiments, the roofing system 200 exhibits a wind uplift resistance of 100 psf to 150 psf as measured according to the 12×24 ft Wind Uplift Test at 23° C. and 50% relative humidity. In some embodiments, the roofing system 200 exhibits a wind uplift resistance of 100 psf to 140 psf as measured according to the 12×24 ft Wind Uplift Test at 23° C. and 50% relative humidity. In some embodiments, the roofing system 200 exhibits a wind uplift resistance of 100 psf to 130 psf as measured according to the 12×24 ft Wind Uplift Test at 23° C. and 50% relative humidity. In some embodiments, the roofing system 200 exhibits a wind uplift resistance of 100 psf to 102 psf as measured according to the 12×24 ft Wind Uplift Test at 23° C. and 50% relative humidity. In some embodiments, the roofing system 200 exhibits a wind uplift resistance of 100 psf to 110 psf as measured according to the 12×24 ft Wind Uplift Test at 23° C. and 50% relative humidity.

In some embodiments, the roofing system 200 exhibits a wind uplift resistance of 110 psf to 250 psf as measured according to the 12×24 ft Wind Uplift Test at 23° C. and 50% relative humidity. In some embodiments, the roofing system 200 exhibits a wind uplift resistance of 120 psf to 250 psf as measured according to the 12×24 ft Wind Uplift Test at 23° C. and 50% relative humidity. In some embodiments, the roofing system 200 exhibits a wind uplift resistance of 130 psf to 250 psf as measured according to the 12×24 ft Wind Uplift Test at 23° C. and 50% relative humidity. In some embodiments, the roofing system 200 exhibits a wind uplift resistance of 140 psf to 250 psf as measured according to the 12×24 ft Wind Uplift Test at 23° C. and 50% relative humidity. In some embodiments, the roofing system 200 exhibits a wind uplift resistance of 150 psf to 250 psf as measured according to the 12×24 ft Wind Uplift Test at 23° C. and 50% relative humidity. In some embodiments, the roofing system 200 exhibits a wind uplift resistance of 160 psf to 250 psf as measured according to the 12×24 ft Wind Uplift Test at 23° C. and 50% relative humidity. In some embodiments, the roofing system 200 exhibits a wind uplift resistance of 170 psf to 250 psf as measured according to the 12×24 ft Wind Uplift Test at 23° C. and 50% relative humidity. In some embodiments, the roofing system 200 exhibits a wind uplift resistance of 180 psf to 250 psf as measured according to the 12×24 ft Wind Uplift Test at 23° C. and 50% relative humidity. In some embodiments, the roofing system 200 exhibits a wind uplift resistance of 190 psf to 250 psf as measured according to the 12×24 ft Wind Uplift Test at 23° C. and 50% relative humidity. In some embodiments, the roofing system 200 exhibits a wind uplift resistance of 200 psf to 250 psf as measured according to the 12×24 ft Wind Uplift Test at 23° C. and 50% relative humidity. In some embodiments, the roofing system 200 exhibits a wind uplift resistance of 210 psf to 250 psf as measured according to the 12×24 ft Wind Uplift Test at 23° C. and 50% relative humidity. In some embodiments, the roofing system 200 exhibits a wind uplift resistance of 220 psf to 250 psf as measured according to the 12×24 ft Wind Uplift Test at 23° C. and 50% relative humidity. In some embodiments, the roofing system 200 exhibits a wind uplift resistance of 230 psf to 250 psf as measured according to the 12×24 ft Wind Uplift Test at 23° C. and 50% relative humidity. In some embodiments, the roofing system 200 exhibits a wind uplift resistance of 240 psf to 250 psf as measured according to the 12×24 ft Wind Uplift Test at 23° C. and 50% relative humidity.

Figure 3:
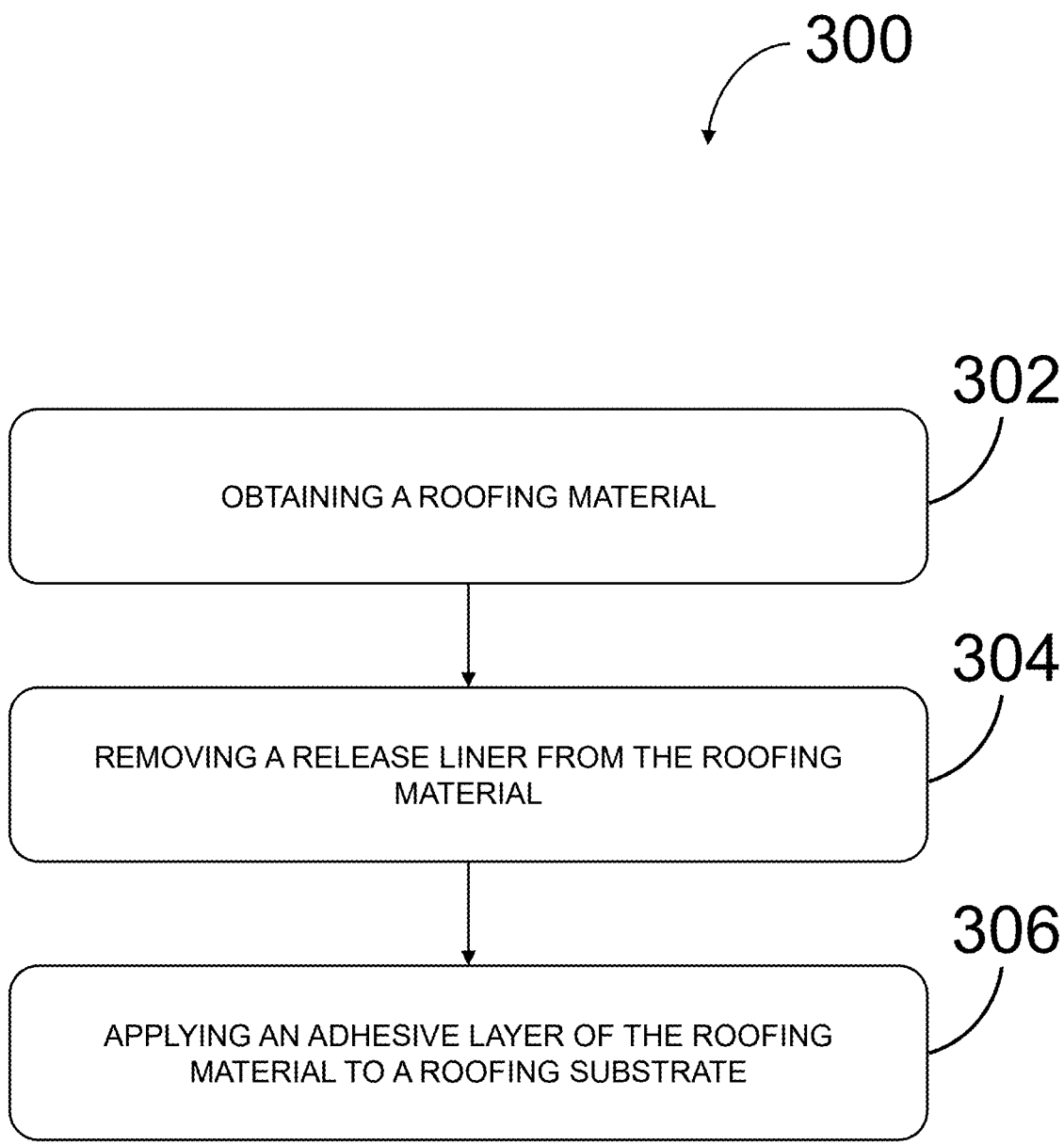
FIG. 3 is a schematic diagram of a flowchart of a method of installation, according to some embodiments.

FIG. 3 is a schematic diagram of a flowchart of a method 300 of installation, according to some embodiments. As shown in FIG. 3, in some embodiments, the method 300 of installation comprises one or more of the following steps: obtaining 302 a roofing material; removing 304 a release liner from the roofing material, so as to expose an adhesive layer; and applying 306 the adhesive layer to a roofing substrate, so as to adhere the roofing material to the roofing substrate. In some embodiments, when the method 300 of installation comprises obtaining a roll of the roofing material, the method 300 of installation further comprises unrolling (not shown) the roofing material.

At step 302, in some embodiments, the method 300 of installation comprises obtaining a roofing material.

In some embodiments, the roofing material comprises any one or more of the roofing materials disclosed herein. In some embodiments, the roofing material comprises a first layer. In some embodiments, the first layer comprises a thermoplastic polymer. In some embodiments, the first layer comprises 0.01% to 35% by weight of a butene-containing polymer based on a total weight of the first layer. In some embodiments, the roofing material comprises an adhesive layer. In some embodiments, the roofing material comprises a release liner. In some embodiments, the adhesive layer is located between the first layer and the release liner. Although various embodiments of the roofing material are provided, it will be appreciated that any one or more of the roofing materials disclosed herein—including, for example and without limitation, any one or more of the first layers, adhesive layers, reinforcement layers, release liners, etc., —may be used, without departing from the scope of this disclosure. For simplicity, the roofing materials are not repeated here.

At step 304, in some embodiments, the method 300 of installation comprises removing the release liner from the roofing material.

In some embodiments, the removing comprises peeling the release liner from the roofing material. In some embodiments, the removing comprises pulling the release liner off the roofing material. In some embodiments, the removing comprises detaching the release liner from the roofing material. In some embodiments, the removing comprises decoupling the release liner from the roofing material. In some embodiments, the removing comprises separating the release liner from the roofing material. In some embodiments, the removing comprises peeling the release liner from the adhesive layer of the roofing material. In some embodiments, the removing comprises pulling the release liner off the adhesive layer of the roofing material. In some embodiments, the removing comprises detaching the release liner from the adhesive layer of the roofing material. In some embodiments, the removing comprises decoupling the release liner from the adhesive layer of the roofing material. In some embodiments, the removing comprises separating the release liner from the adhesive layer of the roofing material.

At step 306, in some embodiments, the method 300 of installation comprises applying the adhesive layer to the roofing substrate, so as to adhere the roofing material to the roofing substrate.

In some embodiments, the applying comprises adhering the roofing material to the roofing substrate. In some embodiments, the applying comprises pressing the roofing material onto the roofing substrate. In some embodiments, the applying comprises rolling the roofing material onto the roofing substrate. In some embodiments, the applying comprises brushing the roofing material onto the roofing substrate. In some embodiments, the applying comprises contacting the roofing substrate with the roofing material. In some embodiments, the applying comprises contacting the roofing substrate with the adhesive layer of the roofing material. In some embodiments, the applying comprises curing the adhesive of the adhesive layer. In some embodiments, for example, the applying comprises at least one of exposing to moisture, irradiating with light, heating to a temperature sufficient to cure the adhesive of the adhesive layer, or any combination thereof. In some embodiments, the applying comprises positioning the roofing material onto the roofing substrate. It will be appreciated that any one or more of the roofing substrates disclosed herein may be used, without departing from the scope of this disclosure. For simplicity, the roofing substrates are not repeated here.

Example 1

Sample roofing membranes were prepared and compared to a control roofing membrane. Each of the sample roofing membranes comprised a first layer and an adhesive layer. The first layer for each of the sample roofing membranes comprised a thermoplastic polyolefin (TPO) as a major polymer; and a butene-based ethylene copolymer as a minor polymer. Details for the first layer—specifically, the major polymer and the minor polymer (if present)—and the adhesive, for both the sample roofing membranes and the control roofing membrane, are summarized in Table 1 below. As shown in Table 1 below, the weight percentages of the butene-based ethylene copolymer were varied. The control roofing membrane was similar to the various roofing membranes, except the control roofing membrane did not comprise the minor polymer—i.e., the butene-based ethylene copolymer.

TABLE 1

Major Polymer and Minor Polymer for First Layer and Adhesive for Adhesive Layer

|  | Control Membrane | Sample 1 | Sample 2 | Sample 3 |
| --- | --- | --- | --- | --- |
| Major Polymer of First Layer | TPO | TPO | TPO | TPO |
| Minor Polymer of First Layer | None | 21 wt. % of butene-based ethylene copolymer | 21 wt. % of butene-based ethylene copolymer | 25 wt. % of butene-based ethylene copolymer |
| Adhesive of Adhesive Layer | Water-based acrylic | Water-based acrylic | Water-based acrylic | Water-based acrylic |

Example 2

The peel strength of the sample roofing membranes was measured and compared to the peel strength of the control roofing membrane. Each of the sample roofing membranes and the control roofing membrane were adhered to an oriented strand board (OSB), and the peel strength was measured according to ASTM D413. The measured peel strengths for each of the sample roofing membranes and the control roofing membrane are summarized in Table 2 below.

TABLE 2

Peel Strength of Sample Roofing Membranes and Control Roofing Membrane

|  | Control | Sample 1 | Sample 2 | Sample 3 |
| --- | --- | --- | --- | --- |
| Peel Strength (PLI) | 4.5 | 6.2 | 6.8 | 6.2 |

As shown in Table 2, each of the sample roofing membranes exhibited an increase in peel strength when the butene-based ethylene copolymer was incorporated into the first layer as a minor polymer, relative to the control roofing membrane.

Example 3

The flexibility and stretchability of the sample roofing membranes were measured and compared to the flexibility and stretchability of the control roofing membrane. For the flexibility, the elongation modulus (psi) was measured at 100% elongation in the machine direction (MD) and the cross-machine direction (CMD), both according to ASTM D412. For stretchability, the percentage elongation at break in the machine direction (MD) was measured according to ASTM D412. The elongation modulus and the percentage elongation for each of the sample roofing membranes and the control roofing membrane are summarized in Table 3 below.

TABLE 3

Tensile Properties of Sample Roofing Membranes and Control Roofing Membrane

| | Control | Sample 1 | Sample 2 | Sample 3 |
|---|---|---|---|---|
| Elongation Modulus (psi), MD/CMD | 393/269 | 318/317 | 384/316 | 399/313 |
| Percentage (%) Elongation at Break, CMD | 1450 | 1436 | 1340 | 1550 |

As shown in Table 3, each of the sample roofing membranes exhibited similar or improved elongation modulus in the MD and CMD, relative to the control roofing membrane. In addition, each of the sample roofing membranes exhibited similar or improved percentage elongation at break in the CMD, relative to the control roofing membrane.

What is claimed is:

1. A roofing system comprising:
a roofing substrate; and
a roofing membrane,
wherein the roofing membrane is located on the roofing substrate;
wherein the roofing membrane comprises:
a polymer layer,
wherein the polymer layer comprises:
a thermoplastic polymer; and
0.01% to 35% by weight of a copolymer based on a total weight of the polymer layer,
wherein the copolymer comprises a butene copolymer; and
an adhesive layer,
wherein the adhesive layer is located between the first polymer layer and the roofing substrate;
wherein the adhesive layer comprises a liquid-based adhesive; and
wherein the adhesive layer directly contacts the roofing substrate.

2. The roofing system of claim 1, wherein the roofing substrate comprises at least one of a roof deck, an oriented strand board, or any combination thereof.

3. The roofing system of claim 1, wherein the thermoplastic polymer comprises at least one of a polypropylene, a polyethylene, or any copolymer thereof.

4. The roofing system of claim 1, wherein the butene copolymer comprises at least one of ethylene, propylene, or any combination thereof.

5. The roofing system of claim 4, wherein the butene copolymer comprises at least one of 1-butene, 2-butene, isobutene, or any combination thereof.

6. The roofing system of claim 1, wherein the butene copolymer comprises at least one of a copolymer of a butene and an ethylene, a copolymer of a butene and a propylene, or any combination thereof.

7. The roofing system of claim 1, wherein the polymer layer comprises:
51% to 99% by weight of the thermoplastic polymer based on a total weight of the thermoplastic polymer and the copolymer; and
1% to 49% by weight of the copolymer based on the total weight of the thermoplastic polymer and the copolymer.

8. The roofing system of claim 1, wherein the polymer layer comprises:
50% to 90% by weight of the thermoplastic polymer based on the total weight of the polymer layer; and
1% to 10% by weight of a filler based on the total weight of the polymer layer.

9. A roofing membrane comprising:
a polymer layer,
wherein the polymer layer comprises:
a thermoplastic polymer; and
0.01% to 35% by weight of a copolymer based on a total weight of the polymer layer,
wherein the copolymer comprises a butene copolymer; and
an adhesive layer,
wherein the adhesive layer comprises a liquid-based adhesive;
wherein, when the roofing membrane is installed, the adhesive layer directly contacts a roofing substrate.

10. The roofing membrane of claim 9, wherein the thermoplastic polymer comprises at least one of a polypropylene, a polyethylene, or any copolymer thereof.

11. The roofing membrane of claim 9, wherein the butene copolymer comprises at least one of ethylene, propylene, or any combination thereof.

12. The roofing membrane of claim 11, wherein the butene copolymer comprises at least one of 1-butene, 2-butene, isobutene, or any combination thereof.

13. The roofing membrane of claim 9, wherein the butene copolymer comprises at least one of a copolymer of a butene and an ethylene, a copolymer of a butene and a propylene, or any combination thereof.

14. The roofing membrane of claim 9, wherein the first polymer layer comprises:
51% to 99% by weight of the thermoplastic polymer based on a total weight of the thermoplastic polymer and the copolymer; and
1% to 49% by weight of the copolymer based on the total weight of the thermoplastic polymer and the copolymer.

15. The roofing membrane of claim 9, wherein the first polymer layer comprises:
50% to 90% by weight of the thermoplastic polymer based on the total weight of the polymer layer; and
1% to 10% by weight of a filler based on the total weight of the polymer layer.

16. A method of installation comprising:
obtaining a roofing membrane,
wherein the roofing membrane comprises:
a polymer layer,
wherein the polymer layer comprises:
a thermoplastic polymer; and
0.01% to 35% by weight of a copolymer based on a total weight of the polymer layer,
wherein the copolymer comprises a butene copolymer;
an adhesive layer,
wherein the adhesive layer comprises a liquid-based adhesive; and
a release liner;
wherein the adhesive layer is located between the first polymer layer and the release liner;
removing the release liner from the roofing membrane, so as to expose the adhesive layer; and applying the adhesive layer directly to a roofing substrate, so as to adhere the roofing membrane to the roofing substrate.

17. The method of claim 16, wherein the thermoplastic polymer comprises at least one of a polypropylene, a polyethylene, or any copolymer thereof.

18. The method of claim 16, wherein the butene copolymer comprises at least one of ethylene, propylene, or any combination thereof.

19. The method of claim 18, wherein the butene copolymer comprises at least one of 1-butene, 2-butene, isobutene, or any combination thereof.

20. The method of claim 16, wherein the butene copolymer comprises at least one of a copolymer of a butene and an ethylene, a copolymer of a butene and a propylene, or any combination thereof.

* * * * *